United States Patent
George et al.

(10) Patent No.: US 8,230,892 B1
(45) Date of Patent: Jul. 31, 2012

(54) THERMOPLASTIC WELDING APPARATUS AND METHOD

(75) Inventors: Charles T. George, Lake Milton, OH (US); John W. Clark, Navarre, OH (US)

(73) Assignee: Hapco Inc., Kent, OH (US)

( * ) Notice: Subject to any disclaimer, the term of this patent is extended or adjusted under 35 U.S.C. 154(b) by 181 days.

(21) Appl. No.: 12/802,857

(22) Filed: Jun. 16, 2010

(51) Int. Cl.
*B30B 3/04* (2006.01)
*B32B 37/30* (2006.01)

(52) U.S. Cl. ...... 156/499; 156/537; 156/555; 156/308.4

(58) Field of Classification Search .......... 156/537, 156/308.2, 308.4, 309.6, 309.9, 580–583.91, 156/544, 555, 499
See application file for complete search history.

(56) References Cited

U.S. PATENT DOCUMENTS

| | | | |
|---|---|---|---|
| 4,146,419 A | | 3/1979 | Neidhart |
| 4,764,328 A * | | 8/1988 | Matz et al. ............ 264/248 |
| 4,960,478 A * | | 10/1990 | Newkirk et al. ....... 156/228 |
| 5,051,148 A * | | 9/1991 | Resch ................... 156/358 |
| 5,106,449 A * | | 4/1992 | Fazzina et al. ........ 156/510 |
| 5,863,378 A | | 1/1999 | Panjwani |
| 6,050,317 A | | 4/2000 | Weissfloch |
| 6,153,033 A | | 11/2000 | Kriefske |
| 6,378,589 B1 | | 4/2002 | Struve |
| 2004/0056077 A1* | | 3/2004 | Ito ....................... 228/235.2 |

* cited by examiner

*Primary Examiner* — Kat Wyrozebski
*Assistant Examiner* — Scott W Dodds
(74) *Attorney, Agent, or Firm* — Renner, Kenner, Greive, Bobak, Taylor & Weber

(57) ABSTRACT

A welding device includes a heated wedge having a top surface and a bottom surface, the top and bottom surfaces each including a generally planar portion and a curved potion. The curved portions of the top and bottom surfaces meet at a point. A first pressure plate includes a generally planar contact surface that contacts and covers substantially the entire planar portion of the top surface. A second pressure plate includes a generally planar contact surface that contacts and covers substantially the entire planar portion of the bottom surface.

16 Claims, 5 Drawing Sheets

THERMOPLASTIC WELDING APPARATUS AND METHOD

TECHNICAL FIELD

This invention relates to a welding apparatus for thermoplastic sheets. More particularly, this invention relates to such a welding apparatus that includes a heated wedge and pressure plates that apply pressure to the thermoplastic sheets as they pass over the heating wedge.

BACKGROUND ART

Thermoplastic sheets are used in a variety of industries as a part of weatherproofing systems and landfill and spill containment systems. For example, thermoplastic sheets are often used to make tarps used to protect the material carried by trucks, trains or other vehicles hauling cargo. For many systems, it is necessary to form a weld between the edges of two adjacent thermoplastic sheets. The welds may be used to join two sheets to create a larger thermoplastic sheet, or other seams as required by the particular application. Typically, seams are created by heating the edges of adjacent sheets of thermoplastic above the melting point of the material and then mating and compressing the heated surfaces together.

A variety of thermoplastic welding devices are commercially available. Some of these devices are hand held units that can be used in a field application to join adjacent thermoplastic sheets, and others are stationary units that are typically used in factory settings to produce thermoplastic products. In stationary welding devices it is known to use a heating wedge to heat the thermoplastic sheets above the melting point of the thermoplastic, and then to apply pressure to the heated sheets to bond them together. The edges of the thermoplastic sheets are drawn over and across the heating wedge and into contact with one-another immediately after being heated and prior to cooling. While this technique can be effective in producing consistent high quality welds, the speed at which the welding is performed is relatively slow. The thermoplastic must be drawn across the heating wedge slowly in order to reach the required temperatures to bond with the adjacent sheet.

Thus, the need exists for a thermoplastic sheet welding device that produces consistent high quality welds at an increased rate of speed.

DISCLOSURE OF THE INVENTION

It is an object of one aspect of the present invention to provide a thermoplastic welding device that is capable of operating at high speeds.

It is an object of another aspect of the present invention to provide a welding device, as above, that includes pressure plates that apply pressure to thermoplastic sheets as they pass over a heating wedge.

It is an object of another aspect of the present invention to provide a welding device, as above, that includes a mechanism for moving the heating wedge between a welding position and a disengaged position.

It is an object of another aspect of the present invention to provide a method of welding thermoplastic sheets that includes applying pressure to edges of the sheets as they pass over a heated wedge.

These and other objects of the present invention, as well as the advantages thereof over existing prior art forms, which will become apparent from the description to follow, are accomplished by the improvements hereinafter described and claimed.

In general, a thermoplastic welding device includes a heated wedge having a top surface and a bottom surface, a first pressure plate that contacts the top surface, and a second pressure plate that contacts the bottom surface.

In accordance with another aspect of the present invention, a thermoplastic heat welding device includes a heated wedge having a top surface and a bottom surface, the top and bottom surfaces each including a generally planar portion and a curved portion. The curved portions of the top and bottom surfaces meet at a point. A first pressure plate has a generally planar contact surface that contacts and covers substantially all of the planar portion of the top surface. A second pressure plate has a generally planar contact surface that contacts and covers substantially all of the planar portion of the bottom surface.

In accordance with a further aspect of the present invention, a method of welding the edges of adjacent thermoplastic sheets includes the steps of providing a first thermoplastic sheet having an edge, providing a second thermoplastic sheet having an edge, positioning the edges of the thermoplastic sheets on opposite sides of a heated wedge, drawing the edges of the sheets across the heated wedge using a pair of driven rollers to create heated edges, applying pressure to the sheets as they pass over the heated wedge, and mating the heated edges of the sheets together.

A preferred exemplary thermoplastic welding device according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
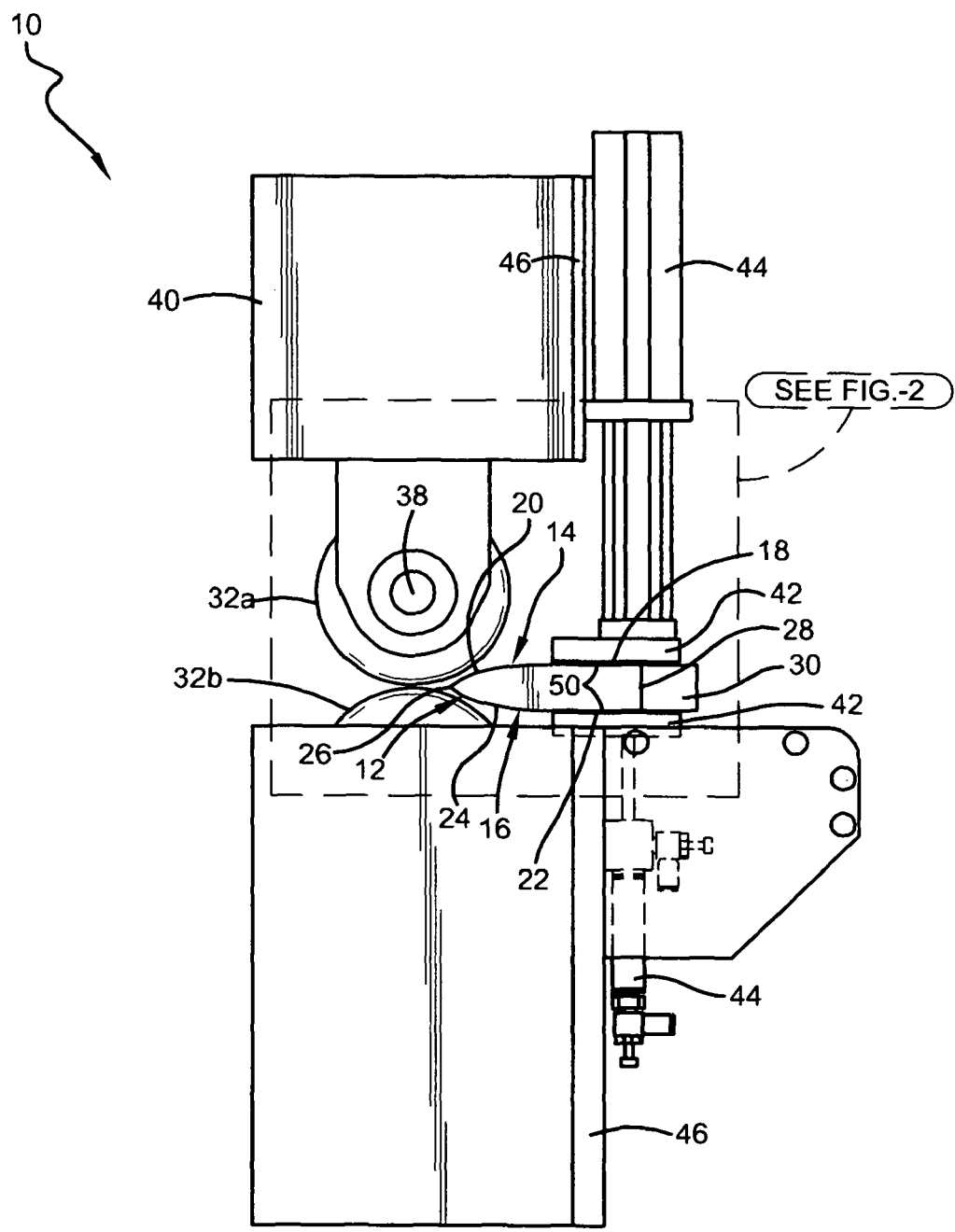
FIG. 1 is a somewhat schematic side elevational view of a welding device according to the concepts of the present invention.

A thermoplastic heat welding device made in accordance with the present invention is indicated generally by the numeral 10. Welding device 10 is adapted to join adjacent sheets of thermoplastic together by heating the edges of the thermoplastic sheets, contacting the heated edges together, and subsequently applying pressure to the mated sheets.

Welding device 10 includes a heated wedge 12 capable of heating the thermoplastic sheets to a temperature greater than the melting point of the thermoplastic. Such heated wedges are known in the art, and are available from a number of commercial suppliers. Heated wedge 12 includes a top surface 14 and a bottom surface 16. Top surface 14 includes a planar portion 18 and a curved portion 20. Likewise, bottom surface 16 includes a planar portion 22 and a curved portion 24. Each of the curved portions 20, 24 extend from the adjacent planar portion 18, 22 and meet at a point 26. While the term curved portion is used, it is contemplated that each of the curved portions 20, 24 may have a radius, or may alternatively be generally flat surfaces angled relative to planar portions 18 and 22. Heated wedge 12 also includes an end surface 28 opposite point 26 and generally orthogonal to planar portions 18 and 22.

Heated wedge 12 may be supported and carried by an arm 30 that may extend generally horizontally in one direction. Arm 30 may also include a vertical portion 30a connected to a positioning assembly (FIGS. 4 & 5), as will be discussed in greater detail herein. Arm 30 may be secured to end surface 28 of heated wedge 12 by any method or mechanism known to those skilled in the art. For example, arm 30 may be secured to heated wedge 12 using mechanical fasteners. Heated wedge 12 may be heated by any method known to those skilled in the art, such as, for example, by including embedded electrical resistance heaters within the wedge. In certain embodiments, the heated wedge 12 may be made of a ceramic material. In other embodiments, the heated wedge 12 may be made of non-corrosive metallic alloys. It should be appreciated, however, that any conductive material known to those skilled in the art may be used to form the heated wedge. The surface temperature of heated wedge may be maintained between approximately 400 and 1,150° F.

Welding device 10 includes a pair of opposed driven rollers 32a and 32b that are provided adjacent to heated wedge 12. Driven rollers 32a and 32b may be powered by an electric motor (not shown), and may be operatively engaged therewith using a drive mechanism, such as a chain or belt arrangement. In certain embodiments, a DC drive may be provided to power the electric motor. It should be appreciated that alternative drive mechanisms known to those skilled in the art may be employed without deviating from the scope of the invention. For example, driven rollers 32a, 32b may alternatively be coupled directly to a rotating shaft of an electric motor. Driven rollers 32a, 32b may be provided with a textured outer surface, or may be made of a high friction material to facilitate the drawing of the thermoplastic sheets therebetween.

Figure 2:
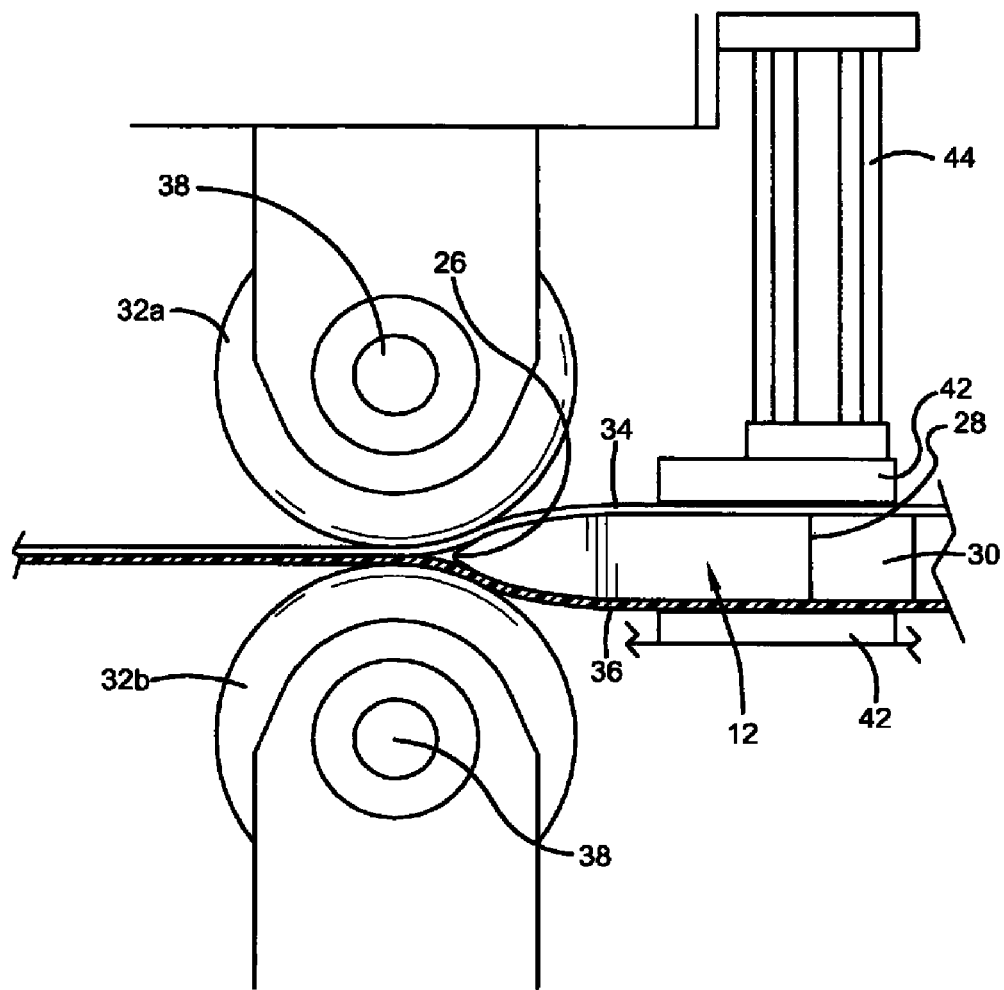
FIG. 2 is a close-up of a portion of the welding device as indicated in FIG. 1.
Figure 3:
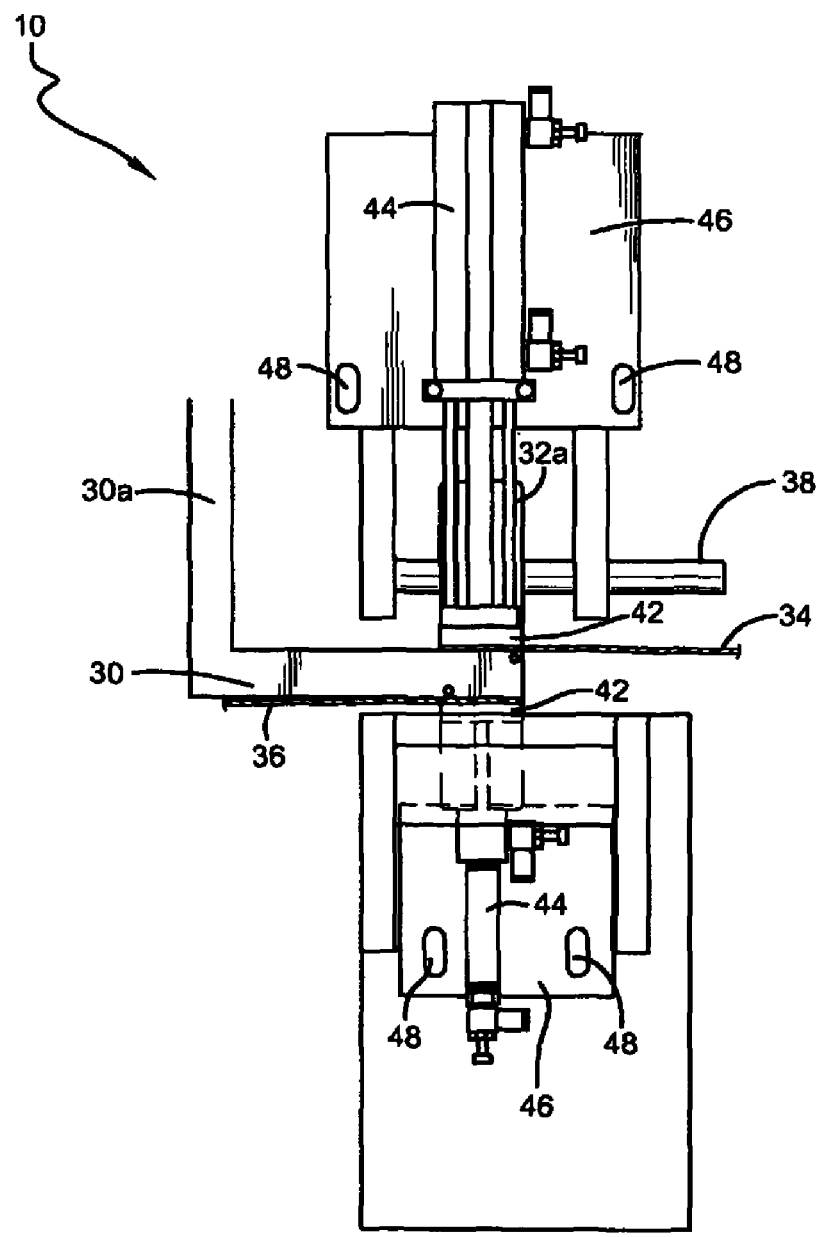
FIG. 3 is a front elevational view of the welding device of FIG. 1.

The point 26 of heated wedge 12 is positioned between driven rollers 32a and 32b without contacting the rollers. As shown in FIG. 2, an upper thermoplastic sheet 34 passes over top surface 14 of heated wedge 12 and a lower thermoplastic sheet 36 passes over the bottom surface 16 of heated wedge 12. The lower surface of the upper sheet 34 and the upper surface of the lower sheet 36 are each heated as they pass over the heated wedge 12. When the sheets reach point 26 of wedge 12 they come into contact with one another and are then drawn between driven rollers 32a and 32b. Driven rollers 32a and 32b act to propel the joined edges of thermoplastic sheets across heated wedge 12, as will be understood by those skilled in the art. The positioning of heated wedge 12 next to driven rollers 32a, 32b ensures that pressure will be applied to the thermoplastic sheets 34, 36 immediately after they have been heated and joined together. Driven rollers 32a and 32b are each rotatably carried by a shaft 38.

One or both of driven rollers 32a or 32b may be vertically adjustable to move between an operating position and a spaced position. In the embodiment depicted in the drawings and described herein, the upper driven roller 32a is carried by shaft 38, which is itself carried by an adjustable cylinder 40. Cylinder 40 is a type of linear actuator, and may be any type of linear actuator known to those skilled in the art, such as, for example, pneumatic or hydraulic linear actuators. Cylinder 40 and upper driven roller 32a are shown in the drawings in the operating position in which driven roller 32a is positioned adjacent to driven roller 32b. Cylinder 40 may selectively cause shaft 38 and driven roller 32a to move upward away from lower driven roller 32b so that a gap exists therebetween. While only upper driven roller 32a is vertically adjustable in the embodiment described, it is also contemplated that a similar arrangement may be employed to allow for vertical adjustment of the bottom driven roller 32b as well.

Figure 4:
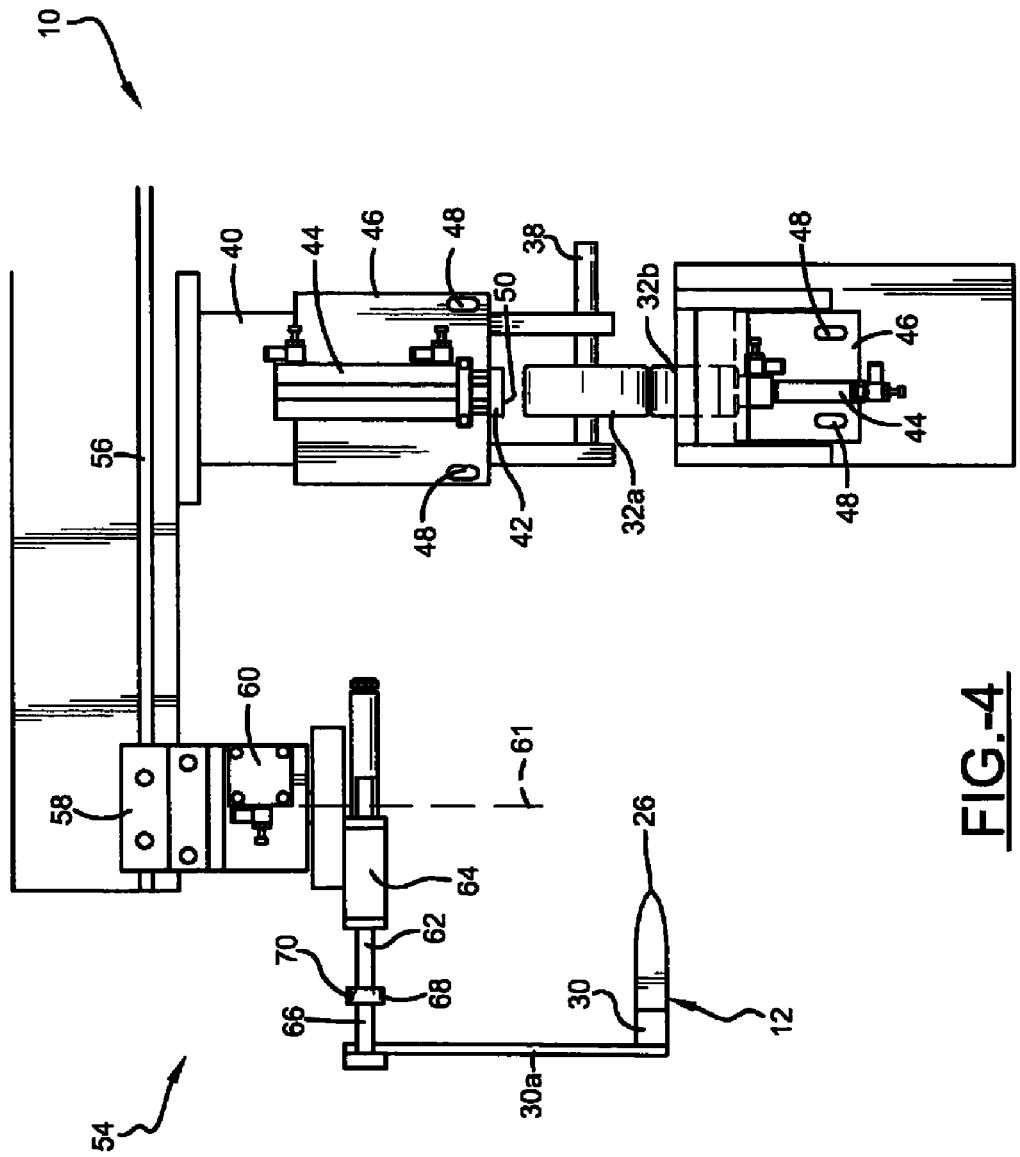
FIG. 4 is a front elevational view of the welding device of FIG. 1 with the heating wedge in a disengaged position.
Figure 5:
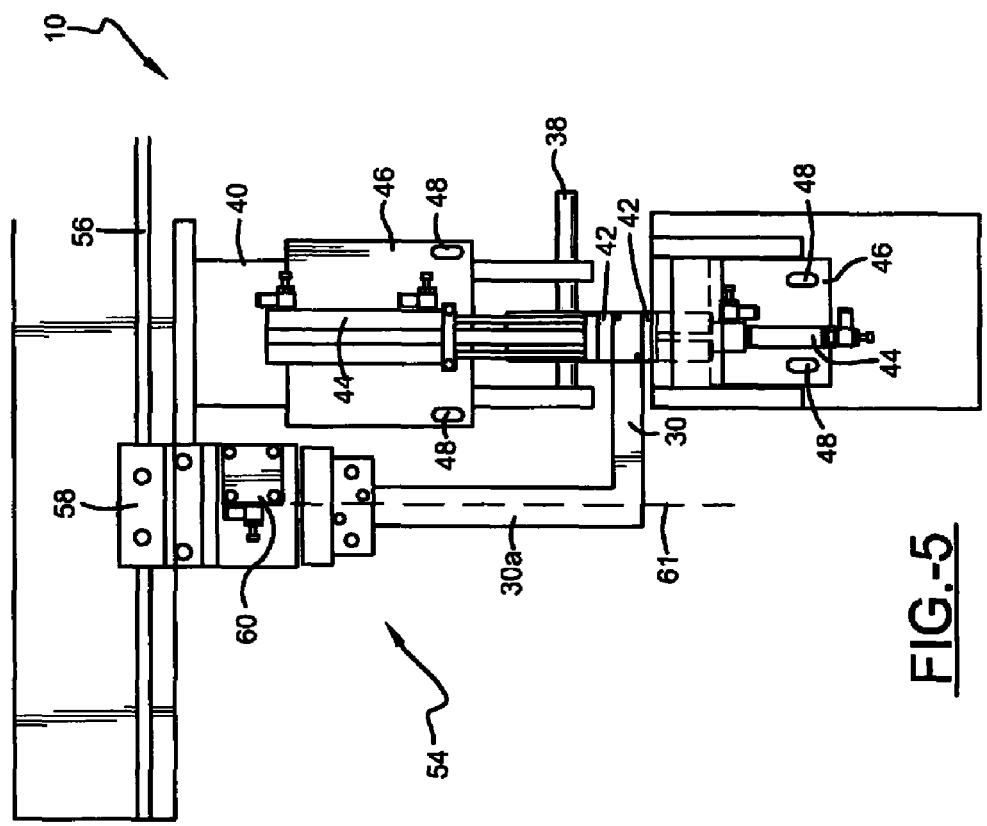
FIG. 5 is a front elevational view of the welding device of FIG. 3 with the heating wedge positioned in a welding position.

Pressure plates 42 contact and engage heated wedge 12 at each of the top and bottom surfaces 14 and 16. Each pressure plate 42 is carried by a linear actuator 44, and is movable between an engaged position (FIGS. 1-3 and 5) and an unengaged position (FIG. 4). Linear actuators 44 may be any type of linear actuator known to those skilled in the art and capable of moving pressure plates 42 linearly and of applying a pressure of at least 40 lbs. In certain embodiments, linear actuators 44 may be configured to apply a pressure of between approximately 40 and 120 lbs. Each linear actuator 44 is securely mounted to a housing or other support structure of welding device 10, and each pressure plate 42 is securely mounted to an end of a linear actuator 44, so that no significant movement of pressure plates 42 is possible except for linear movement generally perpendicular to planar portions 18 and 22 of heated wedge 12.

One or both linear actuators 44 may be secured to a mounting plate 46 that is itself secured to the housing or support structure of welding device 10. Mounting plate 46 may include a plurality of generally vertically oriented slots 48, and bolts, screws or other mechanical fasteners (not shown) may be inserted through slots 48 to secure mounting plate 46 in place. Vertical slots 48 allow for slight vertical adjustment of mounting plate 46 relative to heated wedge 12, which consequently results in vertical adjustment of linear actuator 44 relative to heated wedge 12. As will be appreciated by those skilled in the art, this vertical adjustment of the mounting plate 46 and linear actuators 44 allows for adjustment of the pressure applied by pressure plates 42 to upper and lower thermoplastic sheets 34 and 36.

Each pressure plate 42 includes a generally planar contact surface 50 that faces heated wedge 12. Pressure plates 42 are sized and positioned so that, when in the engaged position, contact surfaces 50 contact and cover substantially all of the planar portions 18, 22 of top and bottom surfaces 14 and 16. Thus, contact surfaces 50 of pressure plates 42 may have a width that is equal to or greater than the width of heated wedge 12. In addition, contact surfaces 50 of pressure plates 42 may have a length that is equal to or greater than the length of planar portions 18 and 22. In certain embodiments contact surfaces 50 may extend past end surface 28 so that a portion of the contact surface 50 contacts a portion of arm 30. Substantially all of curved portions 20, 24 of top and bottom surfaces 14 and 16 are left exposed and uncovered by pressure plates 42 when they are in the engaged position.

Welding device 10 may also include a positioning assembly generally indicated by the numeral 54 that is adapted to move heated wedge 12 from a disengaged position (FIG. 4) to a welding position (FIGS. 1-3 and 5). Positioning assembly 54 includes a first linear motion component, a rotational motion component, and a second linear motion component. The first linear motion component may include a linear rail 56, a rail carriage 58 adapted to slide on the linear rail, and a linear actuator (not shown) to cause generally horizontal movement of the rail carriage 58 relative to linear rail 56. The movement of rail carriage 58 is generally left-to-right or right-to-left movement when viewing FIGS. 4 and 5. The rotational motion component, second linear motion component and arm 30 are carried by rail carriage 58, and heated wedge 12 is secured to an end of arm 30 as previously described, resulting in linear movement of heated wedge 12 when rail carriage 58 is caused to move.

The rotational motion component includes a rotary actuator 60 positioned between arm 30 and rail carriage 58 so that actuation of the rotary actuator causes rotation of arm 30 and heated wedge 12. The rotary actuator 60 is configured to cause rotation of heated wedge 12 about a generally vertical axis 61. The second linear motion component is positioned between arm 30 and rotary actuator 60 and moves arm 30 and heated wedge 12 linearly from left-to-right or right-to-left when viewing FIG. 4. As shown in FIG. 4, the second linear motion component includes a generally horizontal rod 62 extending from a linear actuator 64. A mounting bar 66 extends from a top of arm 30 and includes a collar 68 that is secured to rod 62 by a set-screw 70. The second linear motion component of positioning assembly 54 is adapted to position point 26 of heated wedge 12 adjacent to driven rollers 32a and 32b. Collar 68 and set-screw 70 allow for adjustment of the position of heated wedge 12 relative to driven rollers 32a and 32b to accommodate thermoplastic sheets of varying thicknesses. More space is required between point 26 of heated wedge 12 and driven rollers 32a and 32b when thicker thermoplastic sheets are used.

Positioning assembly 54 allows heated wedge 12 to be moved to the disengaged position (FIG. 3) while thermoplastic sheets are fed between driven rollers 32a and 32b to make positioning of the thermoplastic sheets easier. Following positioning and alignment of the thermoplastic sheets, positioning assembly 54 causes heated wedge 12 to be moved rotationally and linearly in two dimensions from the disengaged position of FIG. 4 into the welding position of FIG. 5 between the thermoplastic sheets and adjacent to the driven rollers 32a, 32b. Guides may be provided to facilitate proper positioning of the thermoplastic sheets adjacent to driven rollers 32a and 32b while the heated wedge 12 is in the disengaged position.

A suitable controller (not shown) is provided to control movement and actuation of the various components of welding device 10. The controller may selectively cause linear movement of cylinder 40 and driven roller 32a, rotation of driven rollers 32a and 32b, linear movement of pressure plates 42 and linear and rotational movement of positioning assembly 54 based upon an operator's input. Such controller systems are well known to those skilled in the art, and the present invention should not be limited by the type of controller selected. In certain embodiments a predetermined sequence of steps may be controlled by actuation of the controller.

In operation, upper thermoplastic sheet 34 and lower thermoplastic sheet 36 are positioned with an edge adjacent to heated wedge 12 and are oriented so that the edges are generally parallel to the length of the heated wedge. The upper driven roller 32a is lowered to secure the edges of the thermoplastic sheets between the upper and lower driven rollers 32a, 32b. The controller may then cause heated wedge 12 to move from the disengaged position to the welding position, and once the heated wedge 12 is in the welding position pressure plates 42 may be caused to contact the thermoplastic sheets 34, 36 positioned over the heated wedge 12. Driven rollers 32a, 32b may then be caused to rotate in opposite directions to draw the thermoplastic sheets therebetween. The pressure plates 42 of welding device 10 apply pressure to thermoplastic sheets 34, 36 as they pass over the top and bottom surfaces 16, 18 of heated wedge 12. The pressure applied by the planar pressure plates 42 allows for faster operation of welding device 10 because heating of the thermoplastic sheets is more effective across the surface area of the wedge. The heated thermoplastic sheets are then mated together adjacent to point 26 of wedge 12 and compressed as they are drawn through driven rollers 32a and 32b to create a welded seam.

It is thus evident that a thermoplastic heat welding device constructed as described herein accomplishes the objects of the present invention and otherwise substantially improves the art.

What is claimed is:

1. A welding device comprising a heated wedge having a top planar surface and a bottom planar surface, a first pressure plate having a planar contact surface adapted to contact said top planar surface of said heated wedge, a second pressure plate having a planar contact surface adapted to contact said bottom planar surface of said heated wedge, and driven rollers positioned adjacent to said heated wedge for drawing material across said heated wedge.

2. The device of claim 1, wherein said heated wedge includes a curved surface extending from each of said top and bottom planar surfaces, the curved surfaces meeting at a point.

3. The device of claim 2, wherein said first pressure plate contacts and covers substantially all of said top planar surface and said second pressure plate contacts and covers substantially all of said bottom planar surface.

4. The device of claim 1, wherein said first and second pressure plates are each movable between an engaged position in which they apply a pressure to said heated wedge, and an unengaged position in which they are spaced from said heated wedge.

5. The device of claim 1, further comprising a linear actuator secured to each of said first and second pressure plates.

6. The device of claim 1, further comprising an arm carrying said heated wedge.

7. The device of claim 6, further comprising a positioning assembly that moves said heated wedge between a welding position and a disengaged position, the positioning assembly including a linear motion component to move said arm linearly and a rotational motion component to rotate said arm about an axis.

8. The device of claim 7, wherein said linear motion component includes a rail, a rail carriage slidably secured to said rail, and a linear actuator.

9. The device of claim 7, wherein said rotational motion component includes a rotary actuator.

10. A welding device comprising a heated wedge having a top surface and a bottom surface, said top and bottom surfaces each including a generally planar portion and a curved portion, said curved portions of said top and bottom surfaces meeting at a point, a pair of driven rollers positioned adjacent to said point, a first pressure plate having a generally planar contact surface that contacts and covers substantially all of said planar portion of said top surface, and a second pressure plate having a generally planar contact surface that contacts and covers substantially all of said planar portion of said bottom surface.

11. The device of claim 10, wherein said first and second pressure plates are each secured to a linear actuator and are movable between an engaged position and an unengaged position.

12. The device of claim 11, further comprising an arm carrying said heated wedge.

13. The device of claim 12, further comprising a positioning assembly that moves said heated wedge between a welding position and a disengaged position, the positioning assembly including a linear motion component to move said arm linearly and a rotational motion component to rotate said arm about an axis.

14. The device of claim 13, wherein said linear motion component includes a rail, a rail carriage slidably secured to said rail, and a linear actuator.

15. The device of claim 13, wherein said rotational motion component includes a rotary actuator.

16. A method of welding the edges of adjacent thermoplastic sheets comprising the steps of positioning a first thermoplastic sheet and a second thermoplastic sheet in a welding device as recited in claim 1, the first and second thermoplastic sheets being positioned on opposite sides of the heated wedge, drawing the first and second thermoplastic sheets across the heated wedge using a pair of driven rollers, applying pressure to the sheets with the first and second pressure plates as they pass over the heated wedge to create heated edges of the sheets, and mating the heated edges of the sheets together.

\* \* \* \* \*